No. 678,733. Patented July 16, 1901.
W. T. HAVARD.
MACHINE FOR CLEANING WHEAT.
(Application filed Nov. 20, 1900.)
(No Model.) 2 Sheets—Sheet 1.

Witnesses
Howard W. Orr.
J. W. Garner

W. T. Havard, Inventor,
by C. A. Snow & Co.
Attorneys

No. 678,733. Patented July 16, 1901.
W. T. HAVARD.
MACHINE FOR CLEANING WHEAT.
(Application filed Nov. 20, 1900.)
(No Model.)  2 Sheets—Sheet 2.

Witnesses
Howard D. Orr.
J. W. Garner

W. T. Havard, Inventor,
by C. A. Snow & Co.
Attorneys

UNITED STATES PATENT OFFICE.

WILLIAM T. HAVARD, OF HENNESSEY, OKLAHOMA TERRITORY.

MACHINE FOR CLEANING WHEAT.

SPECIFICATION forming part of Letters Patent No. 678,733, dated July 16, 1901.

Application filed November 20, 1900. Serial No. 37,135. (No model.)

*To all whom it may concern:*

Be it known that I, WILLIAM T. HAVARD, a citizen of the United States, residing at Hennessey, in the county of Kingfisher and Territory of Oklahoma, have invented a new and useful Machine for Cleaning Wheat, of which the following is a specification.

This invention is an improved machine for cleaning wheat by removing the impurities—such as dust, weevil, must, smut, and the like—therefrom; and it consists in the peculiar construction and combination of devices hereinafter fully set forth, and pointed out in the claims.

The object of this invention is to provide an improved machine which is efficient in beating the wheat so as to dislodge the impurities therefrom without injuring the wheat-berries and in which the dislodged impurities are carried off from the wheat pneumatically while the wheat is being discharged from the machine, thereby materially improving the quality of the wheat and enhancing its value in the market.

Figure 1:
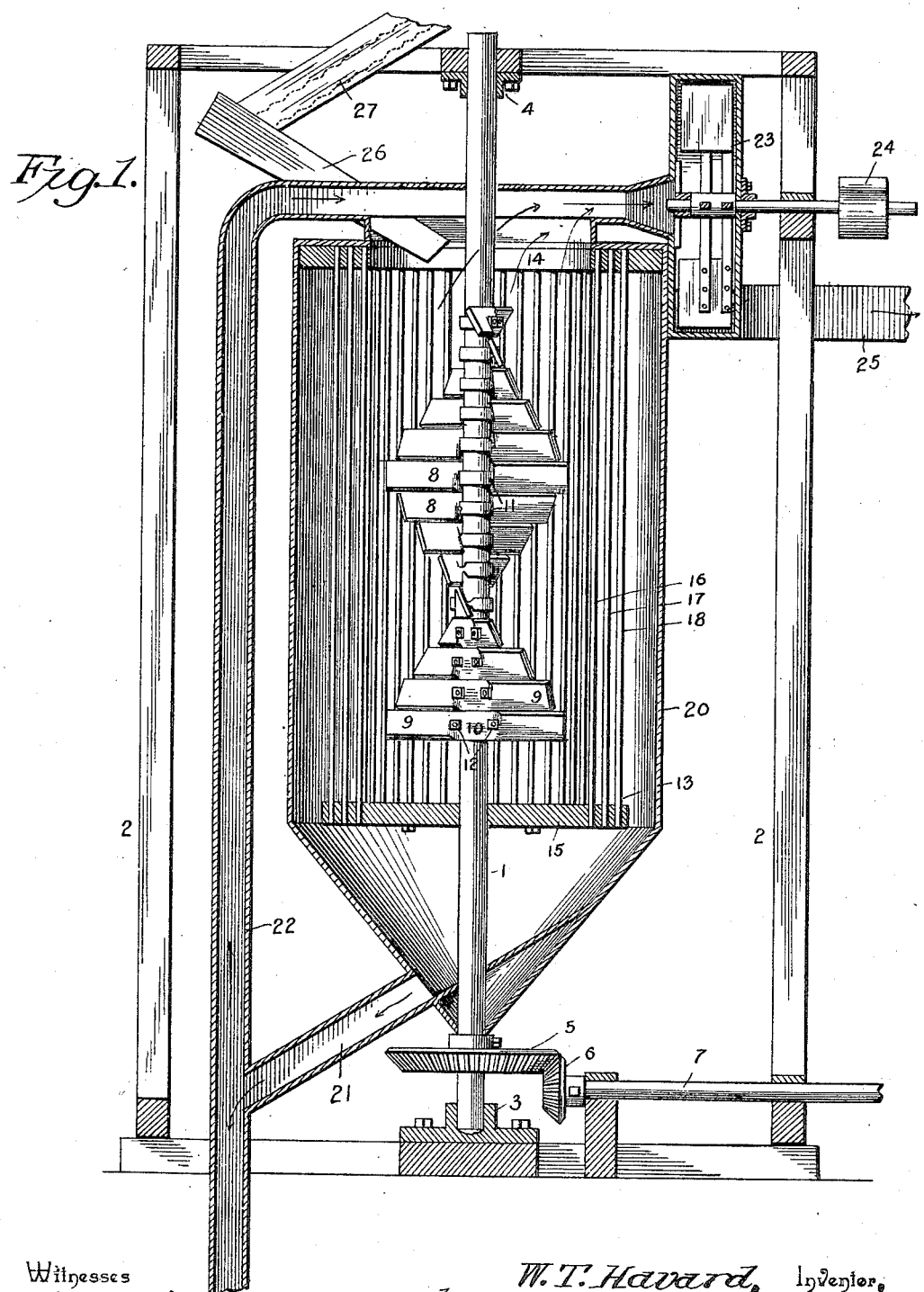
Figure 2:
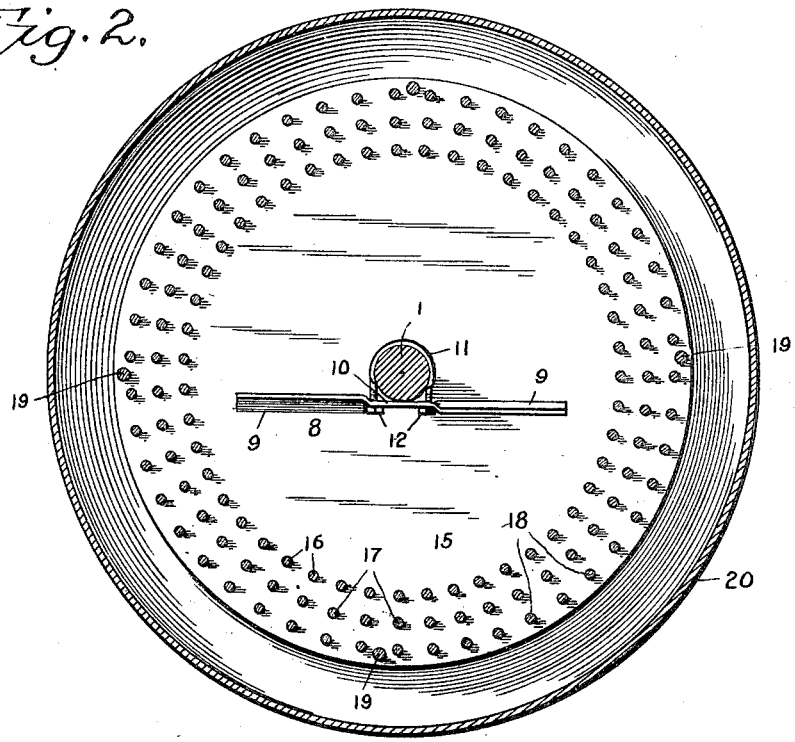
Figure 3:
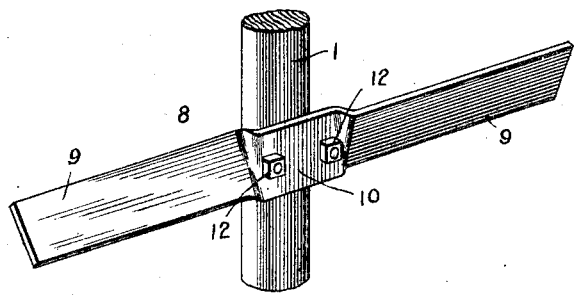

In the accompanying drawings, Figure 1 is a vertical sectional view of the improved wheat-cleaning machine constructed in accordance with this invention. Fig. 2 is a horizontal sectional view of the same, taken on the plane indicated by the line $a\ a$ of Fig. 1. Fig. 3 is a detail perspective view of one of the beaters and a section of the shaft to which it is attached.

A vertical shaft 1 is supported in a suitable frame 2. The lower end of the said shaft is stepped in a bearing 3, and the upper end thereof rotates in a bearing 4. The said shaft is provided near its lower end with a beveled gear-wheel 5, which is engaged by a beveled pinion 6 on a horizontally-disposed shaft 7, to which power is communicated by any suitable means. Any other preferred means may, however, be employed for rotating the shaft 1, as the invention is not limited in this particular. On the said shaft 1 are a series of radial beaters 8, which are disposed one above the other and arranged spirally, as shown in the drawings, the said beaters being inclined at a suitable angle with relation to the shaft 1. Each of said beaters is preferably made of metal, the arms 9 and the central connecting portion 10 being integral and said connecting portion 10 between the inner ends of the arms 9 being flattened and adapted to bear snugly against the shaft 1. Each of said beaters is secured to the said shaft by a U-shaped clip-bolt 11, the curved portion of which embraces the said shaft on the side opposite the portion 10 of the beater and the arms of the said clip-bolt passing through openings in the said central portion 10 of the beater and provided at their outer ends with taps 12, whereby the beater and clip-bolt are firmly clamped to the shaft.

A vertically-disposed cylindrical cage 13 incloses the series of beaters 8 and a portion of the shaft 1, the said cage being concentric to the said shaft. The said cage comprises the annular head 14, the circular bottom 15, and the three series of concentrically-disposed screen-rods 16 17 18, which connect the said head and circular bottom, the ends of the said rods passing through said head and circular bottom and being secured thereto by means of taps, as shown. The said annular head and circular bottom are further secured together by a series (usually four) of connecting-rods 19.

It will be observed by reference to the drawings, more especially to Fig. 2 thereof, that while the series of rods 16 17 18 are disposed concentrically, the one series within the other, the said rods of the said series are disposed in lines which radiate from the center of the shaft 1. It will be further understood that because of the rotation of the shaft 1 and the beaters secured thereto grain which is fed into the cage through the annular head thereof onto the revoluble beaters will be by the latter thrown centrifugally on lines which are tangential to the shaft 1, and hence the radial disposition of the respective rods of the series 16 17 18 will be such as to cause the said rods to most effectually bar the passage of the grain centrifugally from the beaters, so that in effect practically every grain of the wheat will strike one or more of the rods in passing through the series of rods, the beaters and series of rods coacting to effectually dislodge the impurities—such as dust, weevil, must, and smut—from the wheat. Furthermore, the oblique disposition of the beater-arms with relation to the shaft 1 is such as to present the maximum superficial area of the beater-arms in the path of the descending wheat fed into the upper end of the cage and render it certain that each grain of wheat will be struck by at least one of the beater-arms before it reaches the bottom of the cage. A further advantage arising from this oblique disposition of the beater-arms is that the same set up a current of air which ascends or descends within the cage, according to the direction in which the shaft is rotated, which current of air is effective in carrying off the dust and other dislodged impurities in a path at right angles to the paths described by the wheat thrown centrifugally from the said beaters through and between the series of concentric screen-bars forming the barrel of the cage.

The cage is inclosed in an outer vertical cylindrical casing 20, the lower end of which is of inverted conical form and is provided with a discharge-spout 21, which communicates with an exhaust-flue 22, which leads to the casing of an exhaust-fan 23, secured in the upper portion of the frame 2 and is provided with means, as a pulley 24 or the like, whereby it may be rotated. The said flue 22 also communicates with the interior of the casing, at the upper side thereof, so that the offgrade stuff, impurities, and foreign substances will be drawn up pneumatically from the grain in the cage as the grain descends therein and carried off.

It will be understood from the foregoing and by reference to the drawings that the wheat after having been treated in the machine to dislodge the impurities therefrom in passing through the discharge-spout 21 to the flue 22, through which it proceeds to a suitable receiver by gravity, is met by an ascending exhaust-current of air which serves to effectually winnow the wheat and carry off the dislodged impurities therefrom to the casing of the exhaust-fan 23, from which they are blown through a suitable flue 25, which is indicated in Fig. 1 of the drawings.

The wheat is fed to the machine through a feed-spout 26, which discharges into the upper portion of the cage, through the annular head 14 thereof. If preferred, a suitable screen (indicated diagrammatically at 27) may be disposed above the feed-spout 26 and inclined at an angle thereto and adapted to discharge into said feed-spout, the said screen serving to give the wheat a preliminary rubbing and to partially screen the impurities therefrom before the wheat is fed into the cleaning-machine.

I do not desire to limit myself to the precise construction and combination of devices herein shown and described, as it is evident that modifications may be made therein without departing from the spirit of my invention. The beater-arms may be disposed with their sides parallel with the axis of the shaft 1 instead of obliquely with relation thereto, if desired.

What is claimed is—

1. In a wheat-cleaner, the combination of a vertically-disposed revoluble shaft having spirally-disposed beaters, the arms of which are inclined obliquely with relation to the said shaft, and a vertically-disposed cage surrounding the said beaters and having a multiple series of screen or beater rods, the said rods of the said series being disposed in lines which are radial with relation to the center of said shaft, substantially as described.

2. In a machine for cleaning wheat, the combination of a vertically-disposed revoluble shaft, beaters thereon, a cage surrounding the said shaft and in which said beaters operate centrifugally, said cage comprising the annular upper head, the circular bottom and the multiple series of concentrically-disposed screen or beater rods connecting said annular head and circular bottom, said screen or beater rods being disposed in lines which are radial with relation to the center of said shaft, the outer inclosing case in which the said cage is contained, a discharge-spout leading from the lower end of the said inclosing case, a flue with which said discharge-spout communicates and means to create an exhaust-current of air through the said flue, for the purpose set forth, substantially as described.

In testimony that I claim the foregoing as my own I have hereto affixed my signature in the presence of two witnesses.

WILLIAM T. HAVARD.

Witnesses:
J. J. McLEAN,
J. L. RAINEY.